(12) United States Patent
Fewkes et al.

(10) Patent No.: US 6,546,756 B1
(45) Date of Patent: Apr. 15, 2003

(54) METHOD OF MAKING AN OPTICAL FIBER, WITH STORAGE IN A NEW BAG

(75) Inventors: Edward J. Fewkes, Horseheads, NY (US); John S. Peanasky, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/472,734

(22) Filed: Dec. 27, 1999

(51) Int. Cl.⁷ .............................................. C03B 37/027
(52) U.S. Cl. ........................................... 65/376; 65/385
(58) Field of Search ........................... 65/376, 385, 435

(56) References Cited

U.S. PATENT DOCUMENTS

| | | | |
|---|---|---|---|
| 4,138,194 A | * | 2/1979 | Beasley |
| 4,578,097 A | | 3/1986 | Berkey et al. |
| 5,564,881 A | * | 10/1996 | Campbell |
| 5,844,066 A | * | 12/1998 | Kakizawa |
| 5,922,099 A | * | 7/1999 | Yoon et al. .................. 425/468 |
| 5,981,048 A | * | 11/1999 | Sugimoto et al. .......... 206/24.1 |

FOREIGN PATENT DOCUMENTS

| | | | |
|---|---|---|---|
| DE | 3929894 A | 3/1991 | |
| EP | 1033321 | 9/2000 | ........... B65D/81/02 |
| JP | 55003369 | 1/1980 | |
| JP | 58224746 | 12/1983 | |
| JP | 63-242938 A | 10/1988 | |
| JP | 06-199536 A | 7/1994 | |
| JP | 09156711 | 6/1997 | |
| JP | 11001205 | 1/1999 | |
| JP | 2000085714 | 3/2000 | |
| JP | 2000143269 | 5/2000 | |
| WO | 98/18733 | 5/1998 | |
| WO | WO 00/30987 | 6/2000 | ........... C03C/17/00 |

* cited by examiner

Primary Examiner—John Hoffman
(74) Attorney, Agent, or Firm—Robert L. Carlson; Joseph M. Homa

(57) ABSTRACT

Disclosed is a method of protecting glass optical fiber preforms and glass precursor elements for making optical fiber preforms, wherein the preform or glass precursor element is stored within a protective bag. The protective bag preferably has anti-static agents incorporated therein. The protective bags can be employed to protect any glass precursor element used in making optical fiber preforms, for example, glass core canes, glass tubes, or the optical fiber preforms themselves.

17 Claims, 2 Drawing Sheets

FIG. 1
FIG. 2
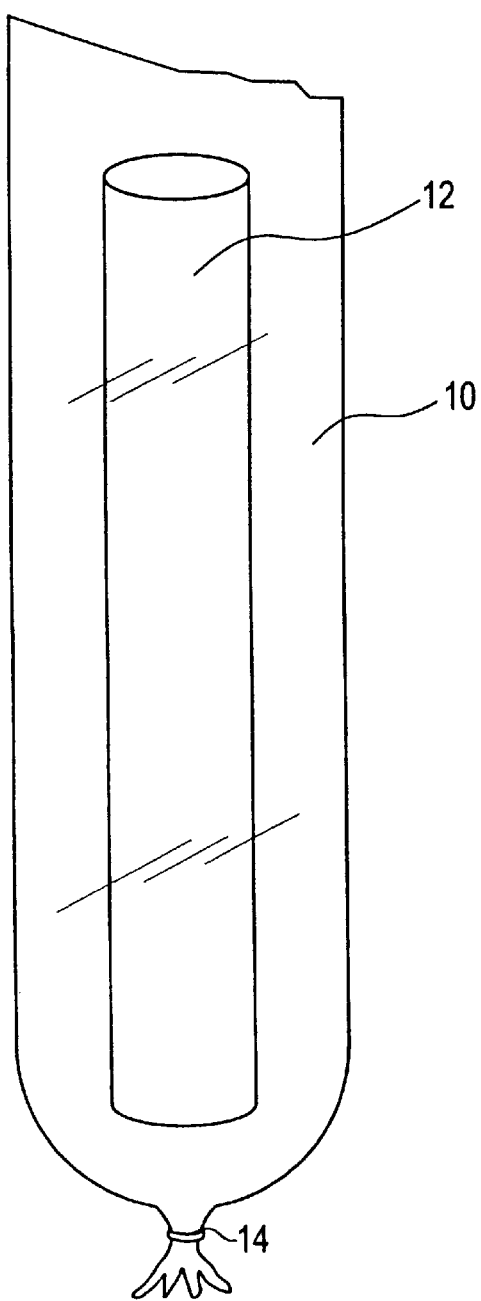
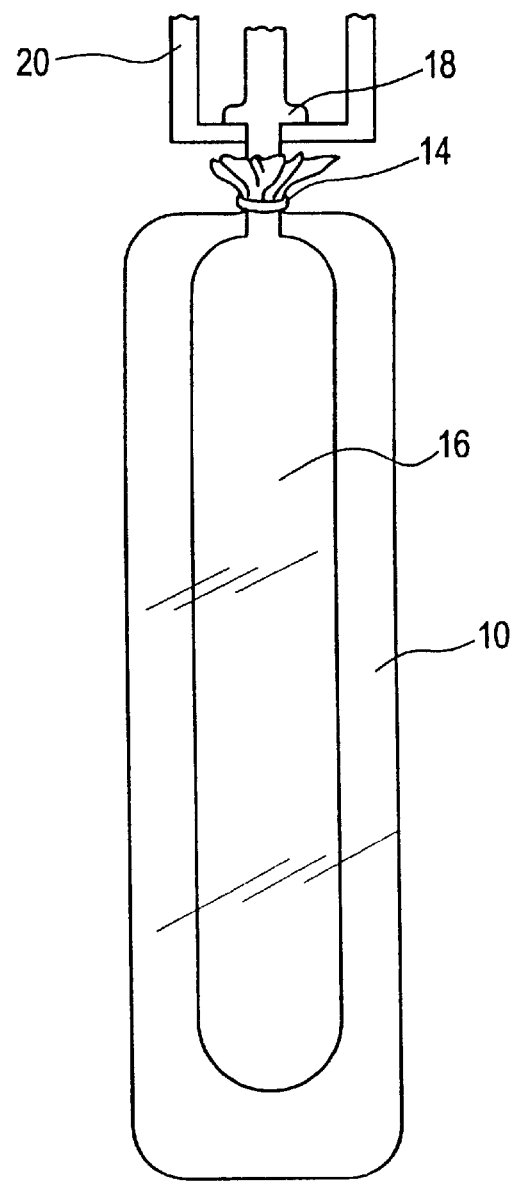

METHOD OF MAKING AN OPTICAL FIBER, WITH STORAGE IN A NEW BAG

FIELD OF THE INVENTION

The present invention relates generally to a method of making an optical fiber, and methods for fabricating optical fiber preforms, core canes and other precursor elements for making optical fiber. More particularly, the present invention relates to a method for protecting an optical fiber preform or a glass precursor element to an optical fiber preform.

BACKGROUND OF THE INVENTION

Methods for making consolidated high-purity glass preforms which may be drawn into optical fiber are well known in the art. Some of the more familiar methods of making such preforms are by flame hydrolysis processes such as the outside vapor deposition process (OVD), modified chemical vapor deposition process (MCVD), vapor axial deposition (VAD) and plasma chemical vapor deposition process. These techniques and combinations thereof are commonly employed to form an optical fiber preform having a core portion and a cladding portion, the core portion having refractive index increasing dopants and/or the cladding having index of refraction decreasing dopants so that the overall refractive index of the cladding is lower than that of the core.

In one OVD method for making optical fiber, the core portion of the soot preform is first formed by introducing various gasses in predetermined amounts into a burner flame. This introduction produces oxides that may include, for example, silicon oxide and germanium oxide. These oxides deposit on a rotating mandrel until the appropriate or desired diameter core portion is reached. The oxides may be introduced in various percentages, as desired, to produce various core refractive index profiles. Once the appropriate core portion has been formed, the mandrel with deposited soot which will make up at least a portion of the core is removed from the OVD lathe. Typically, a handle portion is included on the preform and is integral therewith. The mandrel is then removed from the preform thereby leaving a soot preform having an aperture extending along its axial length and positioned at the preform's centerline.

Next, the soot preform is inserted in a consolidation furnace. First, chlorine gas is included within the muffle portion of the furnace to aid in water removal from the preform. The preform is then heated at a high temperature (generally in the range of between about 1250° C. to about 1700° C., depending upon preform composition) until the deposited soot transforms into a solid, high-purity glass having superior optical properties.

Once the preform is consolidated, it is drawn, typically under a vacuum, to close the centerline aperture and stretch the preform into a smaller diameter core cane of constant diameter as is know to those of skill in the art. The core cane is drawn to a smaller diameter and cut into segments, each of which is then typically overclad with $SiO_2$ soot to an appropriate diameter and again consolidated thereby resulting in an optical fiber preform which is fully consolidated, high optical quality glass. The resulting optical fiber preform is then transferred to a draw furnace to draw the optical fiber.

As used herein, core cane is any solid (i.e., no centerline hole therein) glass precursor element having at least a portion of the core region of what will become the optical fiber, and onto which at least additional cladding, and perhaps additional core material, must be added to form the finished optical fiber preform. Such additional core material may be deposited onto the core cane prior to the cladding being deposited, or various other process steps could be employed, such as so called rod and tube type process steps, to achieve a core cane having a desired refractive index profile across the resultant optical fiber preform. For example, the core cane can alternatively be sleeved with a tube having a desired refractive index profile, after which the core cane/tube assembly can be consolidated and drawn into a second core cane prior to deposition of the final cladding layer.

One of the problems encountered during any process which is employed to make optical fiber preforms, is that dust present in the plant atmosphere can accumulate on the various glass precursor elements used to arrive at a final optical fiber preform. Such dust may include refractory elements from the various furnaces that are present in the plant, as well as various materials that are brought into the plant from the outside atmosphere. This can be a very serious problem, as the presence of a refractory particle can and will cause breaks to occur in the fiber during the fiber draw process. Not only can these dust particles deposit onto completed optical fiber preforms, which has been consolidated into glass, but they also tend to accumulate on any of the various precursor elements such as core canes, glass tubes, or other intermediate precursor glass elements which are employed to arrive at a final optical fiber preform. This problem is only exacerbated by the fact that the glass tubes very often carry a static charge, which will attract such dust particles from the plant atmosphere.

SUMMARY OF THE INVENTION

In accordance with the invention, an improved method is provided for manufacturing a consolidated glass optical fiber preform. In one aspect of the present invention, a substrate for soot deposition and/or a glass precursor article for use in the manufacture of an optical fiber waveguide is produced and, prior to converting the glass article into a fiber, the substrate and/or glass article is stored in a protective bag to protect it from accumulating dust from the plant atmosphere. The precursor element may be any glass or soot precursor to an optical fiber preform, such as, for example, a core cane, a soot body waiting to be consolidated, a glass tube, and so forth. Most preferably, to prevent damage to the glass precursor element, the glass precursor element is consolidated into glass (rather than glass soot) prior to being inserted into the protective bag. Alternatively, the protective bag can be used to protect substrates onto which soot deposition is to take place, such as, for example, alumina and other ceramic bait rods or mandrels that are used in outside vapor deposition processes.

Preferably the protective bag contains an antistatic additive, which most preferably is an internal antistatic additive which is introduced to the bag prior to completion of the manufacture of the bag. For example, the bag may be formed using an extruding step and the antistatic additive added prior to the extruding step. One preferred material for making the bags is polyolefin based materials, e.g. polyethylene.

The protective bag is particularly advantageous in protecting complete, fully consolidated optical fiber preforms, which are ready to be drawn into an optical fiber. Very often, such optical fiber preforms are stored for a period of time in the plant before they are drawn into an optical fiber. Alternatively, the optical fiber preforms may be shipped to another location or even to another manufacturer, to be drawn into optical fiber. During the period of time between completion of the consolidated optical fiber preform and drawing of the preform into optical fiber, the protective bag protects the optical fiber preform from accumulating dust from the plant or outside atmosphere. However, the invention is not limited to protecting optical fiber preforms, and instead can be used to protect any glass precursor article employed in the manufacture of an optical fiber preform. For example, glass rods, core canes, or glass tubes which are to be employed using manufacturing techniques known in the art to combine these glass articles into a fully complete optical fiber preform, all can be protected using the protective bags discussed herein. The method in accordance with the invention minimizes the accumulation of dust on glass precursor elements employed in the manufacture of optical fiber preform.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide and overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is a perspective view of a glass core cane precursor element stored in a protective bag in accordance with the invention.

FIG. 2 is a perspective view of a glass optical fiber preform stored in a protective bag in accordance with the invention.

DETAILED DESCRIPTION OF THE PREFERRED EMBODIMENTS

Figure 3:
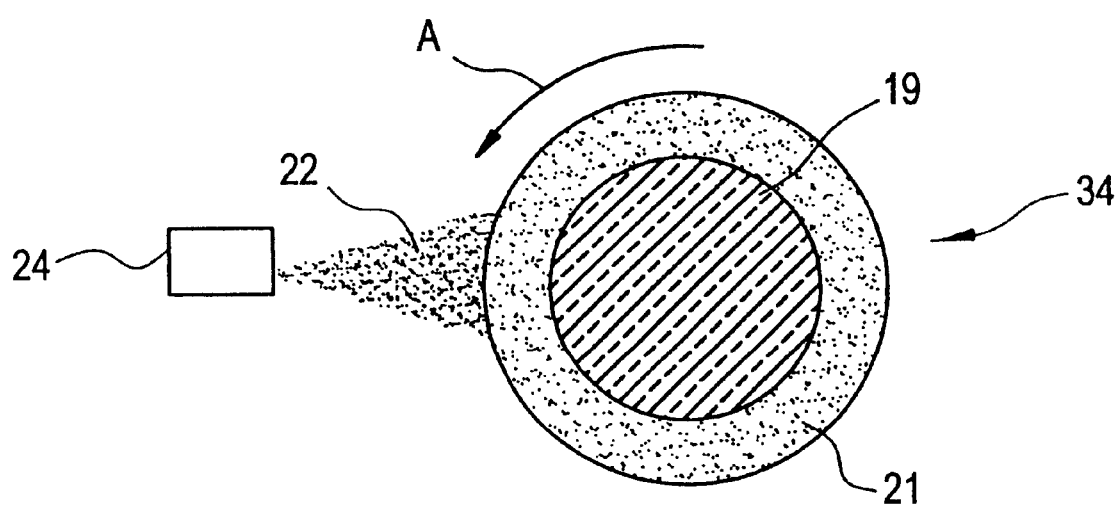
FIG. 3 is a cross sectional schematic view of a soot being deposited on a consolidated rod and tube assembly.

Reference will now be made in detail to the present preferred embodiments of the invention. An exemplary embodiment of the method of the present invention is shown in FIG. 1, which illustrates a method in accordance with the present invention, wherein protective bag 10 is employed to protect core cane 12 from dust which may be in the atmosphere. After the core cane has been produced via one of the many CVD methods known in the art, and the core glass body has been drawn into a core cane, the core cane is inserted into protective bag 10. Preferably, the end into which core cane 12 is inserted into protective bag 10 is closed. Such closure of the protective bag 10 can be accomplished, for example, using a drawstring device 14 around the open end of protective bag 10 to thereby close it. Preferably other techniques could be used to close the open end of the bag.

FIG. 2 illustrates an alternative embodiment for protecting an optical fiber preform 16 which is fully complete and ready to be drawn into an optical fiber. Prior to being inserted into a draw furnace, and heated to a temperature suitable to draw an optical fiber from the preform 16, such optical fiber preforms 16 are often stored for a period of time until the time comes to draw the optical fiber preform 16 into an optical fiber. During the storage time, the optical fiber preform 16 is often hung in a vertical orientation. This can be done, for example, by providing the optical fiber preform 16 with a handle region 18, around which grippers 20 can grip handle region 18 and thereby hold the optical fiber preform 16 in a vertical orientation.

Preferably, while the optical fiber preform is being stored, a protective bag 10 is placed around the optical fiber preform 16, as illustrated in FIG. 2. Again, the open end of bag 10 is preferably closed using a suitable means 14 for closing the open end of the bag. For example, in the case of a core cane or an optical fiber preform, the bags may be heat sealed at both ends using a heat sealing device that is hot enough to melt or soften the bag sufficiently to close the bag to outside atmosphere, forming a hermetic seal. Alternatively, a drawstring, twist tie, rubber band, duct tape, or other clamping or securing device can be used to clamp the ends of the bag shut. Alternatively, the ends of the bag can be merely tied in a knot, thereby substantially closing the bag to outside atmosphere, albeit perhaps not hermetically sealed.

The protective bag 10 preferably contains an anti-static additive. The anti-static additive preferably is an internal anti-static additive which is introduced to the bag prior to completion of the manufacture of protective bag 10. For example, the bag may be formed via extruding, and the anti-static additive added prior to the extruding step.

Preferred anti-static agents include those anti-static agents selected from the group consisting of alkoxylated alkylamines, fatty acid esters, quaternary ammonium salts, and combinations thereof. Preferably, the anti-static agent is a non-ionic anti-static agent. Most preferably, the anti-static agent is selected from the group consisting of (a) N,N-Bis (hydroxyethyl)laurylamide, (b) a mixture of octadecanoic acid monoester with 1,2,3 propanetriol, (c) N,N-Bis (hydroxyethyl) C13–C15 alkyl amine, and (d) combinations thereof. Such antistatic agents are particularly preferred when employed with a polyolefin based bag, such as, for example, polyethylene. Preferably, these anti-static agents are employed in amounts which are less than about 4 percent by weight, more preferably less than about 2 percent by weight, and most preferably less than about 1 weight percent.

Alternative anti-static agents include anionic alkylsulfonates, alkyl phosphates, dithiocarbonate and carboxylates, non-ionic polyethylene glycol ethers, fatty acid esters, ethanolamides, ethoxylated fatty amines and glycerides of fatty amines. See, for example, "Plastic Additives", 4$^{th}$ Ed., R Gachter et al., Hanser Pub., N.Y., N.Y. (1996) for additional antistatic materials.

Alternatively, such anti-static agents could be applied to the surfaces of the bag. However, when applied to the surface such anti-static agents could leave residual material on the glass precursor element being protected. Consequently, more preferably the anti-static agent is incorporated into the bag during the bag forming process.

The protective bag is preferably provided with a textured surface which is sufficient to facilitate against the surface of the bag sticking together, and therefore facilitate handling and application of the bag onto the preform.

In one embodiment, an optical fiber preform is made in a first manufacturing facility, placed in a protective bag, and then shipped to a second manufacturing facility to be drawn into optical fiber. The second manufacturing facility could be, for example, a customer which buys completed optical fiber preforms from a first manufacturer and then draws them into optical fiber. In this case, the preform is preferably shipped inside its protective bag 10, in a protective hard cover box (e.g. made of wood), the inside of which is provided with a cushioning material to prevent damage to the preform.

In another embodiment, a core cane is produced using OVD, MCVD, PCVD, or VAD processes. As used herein, core cane means a glass preform precursor element which is comprised of at least a portion of the core of the optical fiber preform, and onto which additional core and/or cladding soot material is to be deposited. Such additional soot material is preferably deposited using OVD techniques, such as are illustrated in FIG. 3. As illustrated in FIG. 3, the soot 21 is deposited onto mandrel 19. Alternatively, however, mandrel 19 could replaced core cane 12, for deposition of additional soot 21. The soot 21 is composed of a plurality of individual particles of glass soot material 22. The soot particles 21 are discharged from a deposition burner 24. Any of a variety of known OVD deposition burners may be used to practice the invention. Preferably during deposition, the soot coated assembly 34 is rotated in the direction of arrow A. The soot 21 may be composed of undoped silica, fluorine doped silica, germanium doped silica, or combinations thereof as is known in the art to arrive at a desired refractive index profile.

After formation of the core cane, the core cane is stored in protective bag 10 until it is time to deposit additional soot material onto the core cane. In one embodiment, the core cane is shipped or otherwise transported in the protective bag to a separate manufacturing facility (and/or alternatively sold to a customer) whereupon the core case is removed from the bag and additional soot is then deposited onto the core cane.

Then, the core cane is merely removed from the bag and the manufacturing process continues, with additional soot being added, preferably via an OVD deposition process.

Most preferably, the protective bag 10 also contains no metallic components, as metallic components act as nucleation sites for crystallization (e.g. the formation of crystobalite) within the silica glass.

It will be apparent to those of ordinary skill in the art that various modifications and variations can be made to the present invention without departing from the scope of the invention. Thus, it is intended that the present invention cover the modifications and variations provided they come within the scope of the appended claims and their equivalents.

What is claimed is:

1. A method of making an optical fiber comprising:
   providing an optical fiber preform comprising silica or a glass precursor article used to form the optical fiber preform, or a ceramic mandrel substrate for receiving glass soot used to form the optical fiber preform; and
   storing the optical fiber preform or the glass precursor article or the ceramic mandrel substrate in a protective bag prior to the optical fiber being drawn from the optical fiber preform, wherein the protective bag is formed from a polyolefin-based material, wherein the polyolefin-based material includes an anti-static additive selected from the group consisting of (a) N,N-Bis (hydroxyethyl)laurylamide, (b) a mixture of octadecanoic acid monoester with 1,2,3 propanetriol, (c) N,N-Bis(hydroxyethyl) C13–C15 alkyl amine, and (d) combinations thereof.

2. The method of claim 1, wherein said ceramic mandrel substrate is stored in the protective bag, after which the mandrel is removed from the bag and glass soot is deposited on the mandrel using outside vapor deposition.

3. The method of claim 2, further comprising, after said depositing step, removing said mandrel from said soot, and thereafter storing said ceramic mandrel in said protective bag.

4. The method of claim 3, further comprising drawing said optical fiber preform into the optical fiber after the optical fiber preform is stored in said protective bag.

5. The method of claim 4, wherein said optical fiber preform is made in a first manufacturing facility, and said optical fiber is drawn from said optical fiber preform in a second manufacturing facility, and said method further comprises, prior to said drawing step, transporting said optical fiber preform in said bag to said second manufacturing facility.

6. The method of claim 1, wherein said glass precursor article is a glass core cane or other intermediate glass article for use in the manufacture of optical fiber, and subsequent to said storing step, said core cane or other intermediate glass article is removed from said bag and additional glass is added to said core cane or intermediate glass article.

7. The method of claim 6, wherein said core cane or other intermediate glass article is stored for a period of time prior to adding additional glass thereto.

8. The method of claim 1, wherein said anti-static additive is an internal anti-static additive which is introduced to the bag prior to completion of the manufacture of said bag.

9. The method of claim 1, wherein said bag has a textured surface.

10. The method of claim 1, wherein said bag is formed by extrusion, and said anti-static additive is present in the polyolefin-based material prior to extrusion thereof.

11. The method of claim 1, wherein said optical fiber preform is made in a first manufacturing facility, and said optical fiber is drawn from said optical fiber preform in a second manufacturing facility, and said method further comprises, prior to said drawing step, transporting said optical fiber preform in said bag to said second manufacturing facility.

12. The method of claim 1, wherein said bag contains no metallic components.

13. The method of claim 1, further comprising shipping said optical fiber preform to another manufacturing facility customer to be drawn into optical fiber.

14. The method of claim 1, further comprising shipping said optical fiber preform to a customer to be drawn into optical fiber.

15. The method of claim 1, wherein the glass precursor article is a core cane, and said method further comprises transporting the core cane to a separate manufacturing facility wherein said core cane is removed from said bag and additional soot is then deposited onto said core cane.

16. The method of claim 1, wherein the glass article is a core cane, and said method further comprises selling said core cane to a customer, and said core cane is removed from said bag by said customer and additional soot is then deposited onto said core cane.

17. The method of claim 1, wherein the polyolefin-based material is a polyethylene.

* * * * *

UNITED STATES PATENT AND TRADEMARK OFFICE
CERTIFICATE OF CORRECTION

PATENT NO.   : 6,546,756 B1
DATED        : April 15, 2003
INVENTOR(S)  : Fewkes Edward J. et al.

It is certified that error appears in the above-identified patent and that said Letters Patent is hereby corrected as shown below:

Column 6,
Line 11, "4. The method of claim 3, further comprising drawing said" should be
-- 4. The method of claim 1, further comprising drawing said --

Signed and Sealed this

Fifth Day of August, 2003

JAMES E. ROGAN
*Director of the United States Patent and Trademark Office*